United States Patent
Gebhart

(10) Patent No.: US 10,906,621 B2
(45) Date of Patent: Feb. 2, 2021

(54) TROLLING MOTOR

(71) Applicant: Globe Motors, Inc., Dayton, OH (US)

(72) Inventor: Steven A. Gebhart, Tipp City, OH (US)

(73) Assignee: Globe Motors, Inc., Dayton, OH (US)

( * ) Notice: Subject to any disclaimer, the term of this patent is extended or adjusted under 35 U.S.C. 154(b) by 228 days.

(21) Appl. No.: 16/102,826

(22) Filed: Aug. 14, 2018

(65) Prior Publication Data

US 2019/0054990 A1 Feb. 21, 2019

Related U.S. Application Data

(60) Provisional application No. 62/546,653, filed on Aug. 17, 2017.

(51) Int. Cl.
| | |
|---|---|
| *B63H 21/17* | (2006.01) |
| *B63H 20/00* | (2006.01) |
| *B63H 20/08* | (2006.01) |
| *H02K 5/132* | (2006.01) |
| *H02K 11/33* | (2016.01) |

(52) U.S. Cl.
CPC .......... *B63H 20/007* (2013.01); *B63H 20/08* (2013.01); *H02K 5/132* (2013.01); *H02K 11/33* (2016.01)

(58) Field of Classification Search
CPC ...... B63H 20/00; B63H 20/007; B63H 20/08; H02K 5/12; H02K 5/128; H02K 5/132
USPC .............. 440/6, 53, 61 T, 61 E, 61 G, 76, 84
See application file for complete search history.

(56) References Cited

U.S. PATENT DOCUMENTS

| | | |
|---|---|---|
| 3,814,961 A | 6/1974 | Nelson et al. |
| 3,954,081 A | 5/1976 | Blake |
| 3,954,082 A | 5/1976 | Roller et al. |
| 3,980,039 A * | 9/1976 | Henning .............. B63H 20/007 440/6 |
| 4,114,074 A | 9/1978 | Stewart et al. |
| 4,559,016 A | 12/1985 | Piber |
| 4,944,702 A | 7/1990 | Cain |
| 5,069,642 A | 12/1991 | Henderson |
| 5,078,070 A | 1/1992 | Clement |
| 5,088,943 A | 2/1992 | Henderson |
| 5,108,322 A | 4/1992 | Henderson |
| 5,112,256 A | 5/1992 | Clement |
| 5,171,173 A | 12/1992 | Henderson et al. |
| 5,525,081 A | 6/1996 | Mardesich et al. |
| 5,892,338 A | 4/1999 | Moore et al. |
| 6,054,831 A | 4/2000 | Moore et al. |
| 6,213,821 B1 * | 4/2001 | Bernloehr ............ B63H 20/007 440/59 |
| 6,590,356 B2 | 7/2003 | Smith et al. |
| 6,652,331 B2 | 11/2003 | Healey |
| 6,774,587 B2 | 8/2004 | Makaran et al. |

(Continued)

OTHER PUBLICATIONS

MotorGuide; "History of MotorGuide"; http://www.motorguide.com/about/history; Retrieved on Aug. 24, 2018.

*Primary Examiner* — Daniel V Venne

(74) *Attorney, Agent, or Firm* — Stevens & Showalter LLP

(57) ABSTRACT

A trolling motor is provided comprising a motor housing, a motor controller, and a down tube assembly extending from the motor housing. When the trolling motor is in operation on a boat, the down tube assembly will support the motor housing submerged in water. The motor controller is mounted to the down tube assembly.

19 Claims, 2 Drawing Sheets

(56) References Cited

U.S. PATENT DOCUMENTS

| | | |
|---|---|---|
| 6,902,446 B1 | 6/2005 | Healey |
| 6,919,704 B1 | 7/2005 | Healey |
| 6,986,688 B1 | 1/2006 | Jansen |
| 7,306,496 B1 | 12/2007 | Carmen et al. |
| 7,452,251 B2 | 11/2008 | Boebel |
| 8,072,729 B1 | 12/2011 | Holley |
| 8,081,475 B1 * | 12/2011 | Holley ................ H05K 7/209 361/719 |
| 8,188,876 B1 | 5/2012 | Holley et al. |
| 8,257,122 B1 | 9/2012 | Holley |

* cited by examiner

TROLLING MOTOR

CROSS REFERENCE TO RELATED APPLICATION

This application claims the benefit of U.S. Provisional Patent Application Ser. No. 62/546,653, filed Aug. 17, 2017, entitled "TROLLING MOTOR," the entire disclosure of which is incorporated by reference herein.

FIELD OF THE INVENTION

The invention relates to electrically powered motors for watercraft and, more particularly, to electrically powered watercraft motors that include a control unit or electrical controller for controlling operation of the motor.

BACKGROUND OF THE INVENTION

Electronic control systems for controlling the speed of an electric motor are well known. Such systems may incorporate a manually controlled potentiometer for varying the control signal to a semiconductor switch. In such control systems the power switching device generates significant heat which must be dissipated to protect the control components.

In known configurations of control schemes utilized in electric motors for watercraft, the power switching semiconductor switch may be located within the watertight housing of the lower drive unit of the motor wherein heat given off by the semiconductor switch is transferred to the housing. When the motor is operating in a submersed condition, heat is conducted away from the housing by the water. When the motor is operated out of the water, the housing serves as a heat sink which distributes the heat over a larger surface and dissipates it to the air.

While the aforementioned motor configurations are suitable for their intended purpose, there are disadvantages associated therewith. One disadvantage is that the interior of the motor housing must be structured to provide space for mounting the semiconductor switch therein. Another disadvantage is that heat generated by the semiconductor switch within the sealed housing of the lower unit is additive to heat generated by the motor. If the motor is operated for a substantial period of time in a non-submersed condition, the motor housing may not be an adequate heat sink to dissipate the combined heat to air, thereby entrapping potentially damaging heat within the housing.

SUMMARY OF THE INVENTION

In accordance with an aspect of the invention, a trolling motor is provided comprising a motor housing, a motor controller, and a down tube assembly extending from the motor housing. When the trolling motor is in operation on a boat, the down tube assembly will support the motor housing submerged in water. The motor controller is mounted to down tube assembly.

The down tube assembly may comprise a down tube stem extending from the motor housing and a down tube rigidly affixed to the down tube stem.

The motor controller may be mounted to at least one of the down tube stem and the down tube.

The motor controller may be located within the down tube assembly.

The down tube assembly may comprise an interior surface having a contour, and a heat sink may be in thermal contact with the motor controller and in thermal contact with the down tube assembly.

The heat sink may define a contour matching the interior surface contour of the down tube assembly.

A controller wire tunnel may extend along the motor housing from the down tube assembly.

The trolling motor may further comprise a nose piece attached to a first end of the motor housing, a tail piece attached to a second end of the motor housing, and a skeg attached to at least one of the nose piece, motor housing, or tail piece.

The motor controller may receive signals from one or more sensors adjacent to the rotor to sense a position of the rotor.

The one or more sensors may comprise at least one Hall sensor.

In accordance with another aspect of the invention, a trolling motor is provided comprising a motor housing, a motor controller, and a down tube assembly extending from the motor housing. When the trolling motor is in operation on a boat, the down tube assembly will support the motor housing and the motor controller submerged in water. The motor controller is located within the down tube assembly adjacent to the motor housing.

Controller wires may extend from the motor controller through an outer surface of the motor housing to the trolling motor.

A controller wire tunnel may extend along the outer surface of the motor housing from the down tube assembly.

The motor controller may include a plurality of heat producing components and the plurality of heat producing components may be in thermal communication with the down tube assembly such that a portion of the heat produced by said heat producing components may be conducted to the environment through the down tube assembly.

A heat sink member may extend along a length of the down tube assembly, the heat sink member may be in direct thermal communication with the heat producing components and may further act as a structural stiffening member to the down tube assembly.

The down tube assembly may comprise a down tube stem extending from the motor housing and a down tube rigidly affixed over the down tube stem, and the motor controller may comprise a plurality of components mounted on a printed circuit board mounted within the down tube stem.

In accordance with a further aspect of the invention, a trolling motor is provided comprising a motor housing, a motor controller, and a down tube assembly extending from the motor housing. When the trolling motor is in operation on a boat, the down tube assembly will support the motor housing and the motor controller submerged in water. A heat sink comprising a block of thermally conductive material is affixed to an inner surface of the down tube assembly and in thermal contact with a one or more of heat producing components in the motor controller. The heat sink further acts as a structural stiffening member to the down tube assembly.

The down tube assembly may include an upper end and a lower end, and the motor controller may be located in the lower end of the down tube assembly.

The motor controller may be located within the down tube assembly adjacent to the motor housing.

The trolling motor may comprise a brushless DC motor and the motor controller may comprise a pulse width modulation controller.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

Figure 1:
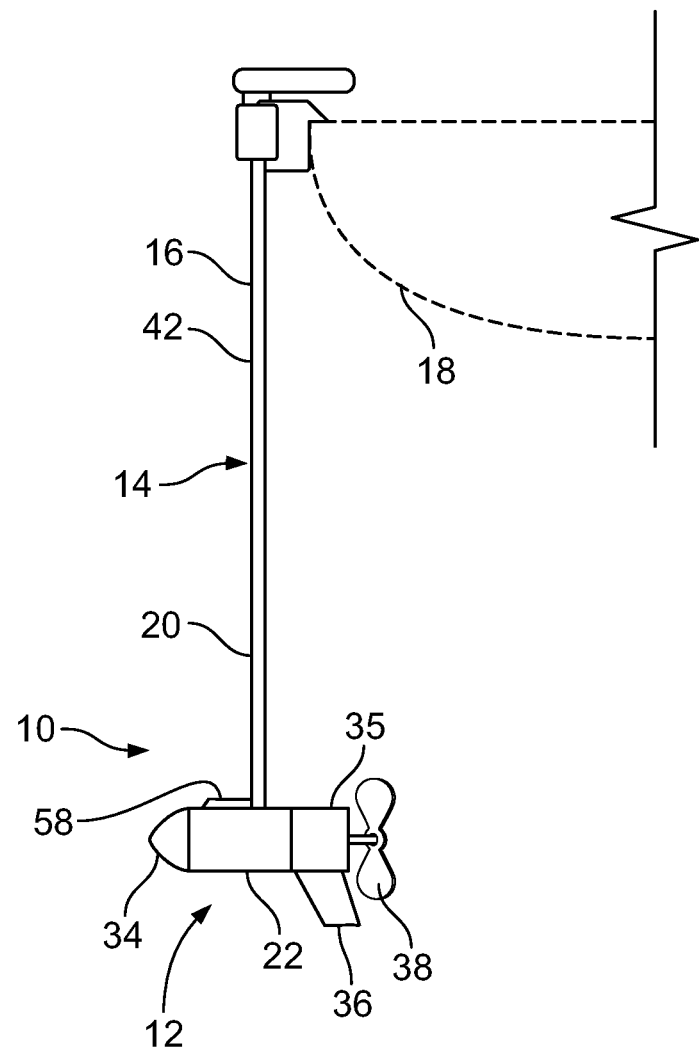
FIG. 1 is a side view of a trolling motor in accordance with aspects of the invention.

Referring to the drawings, and particularly to FIG. 1, there is shown a trolling motor 10 comprising a down unit 12 for submersion in water and a down tube assembly 14 having an upper end 16 for support to a boat 18 and a lower end 20.

Figure 2:
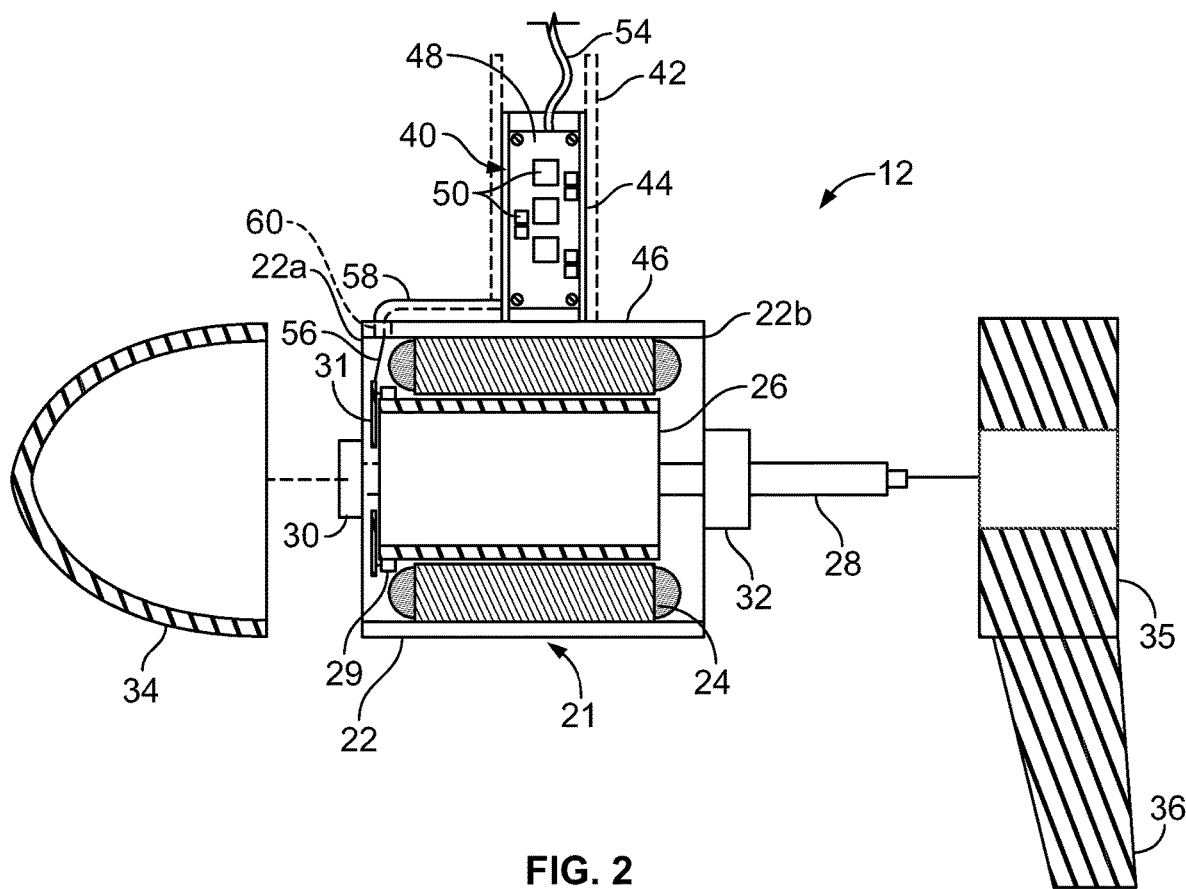
FIG. 2 is a schematic cross-sectional view of a down unit for the trolling motor shown in FIG. 1.

Referring further to FIG. 2, the down unit 12 includes a motor assembly 21 that can generally include a motor housing 22, a stator 24, and a rotor 26. The rotor 26 includes a rotor shaft 28 supported on a front bearing 30 and a rear bearing 32, wherein the rear bearing 32 can include a watertight seal. The motor assembly 21 can comprise a brushless DC motor operated by a pulse width modulation (PWM) circuit and can include Hall sensors 29 mounted to a printed circuit board 31 for sensing the position of magnets rotating with the rotor 26 and providing signals to a motor controller 40 mounted to the down tube assembly 14, as is discussed further below. Alternatively, one or more sensors may be positioned adjacent to the rotor shaft 28 to derive commutation signals from an adjacent element(s) on the shaft 28. Further, it may be understood that, in addition to pulse width modulation, the motor controller may comprise alternative control schemes including linear or frequency modulation motor control, and may comprise trapezoidal, sinusoidal, or similar waveform generation schemes.

It should be understood that, although a brushless DC motor is described for exemplary purposes herein, in the broadest form of the invention, the present description is not necessarily limited to a motor assembly 21 comprising a brushless DC motor and other motors operating under control of a controller having heat generating components may be included in the motor assembly 21.

The down unit 12 additionally includes a nose piece 34 attached to a first end 22a of the motor housing 22, a tail piece 35 and skeg 36 attached to a second end 22b of the motor housing 22, and a propeller 38 (FIG. 1) mounted to the rotor shaft 28 behind the tail piece 35 and skeg 36. The nose piece 34 can be configured to contain additional components such as sensing components, e.g., sonar sensors (not shown). It may be noted that the nose piece 34 and the tail piece 35 and skeg 36 can comprise existing components configured for attachment to motor assemblies of trolling motors. Further, it should be understood that the skeg 36 can be attached to any one of the nose piece 34, the motor housing 22, or the tail piece 35.

Referring to FIGS. 1 and 2, the down tube assembly 14 includes a down tube 42, and a down tube stem 44 extending from the motor housing 22. The down tube 42 is rigidly affixed to and preferably forms a watertight seal over the down tube stem 44. The down tube stem 44 can be formed integrally with and extend outwardly from an outer surface 46 of the motor housing 22. For example, the motor housing 22 and down tube stem 44 may be formed of a single casting of aluminum.

As mentioned above, the motor controller 40 is mounted to the down tube assembly 14 and, in accordance with a general aspect of the described structure, may be located anywhere along the length of the down tube assembly 14. As is illustrated herein, the motor controller 40 can be located within the down tube assembly 14 and can be positioned at a location along a portion of the lower end 20 (FIG. 1) thereof. For example, the motor controller may be located adjacent to the motor housing 22, mounted to either the down tube 42 or the down tube stem 44.

Figure 3:
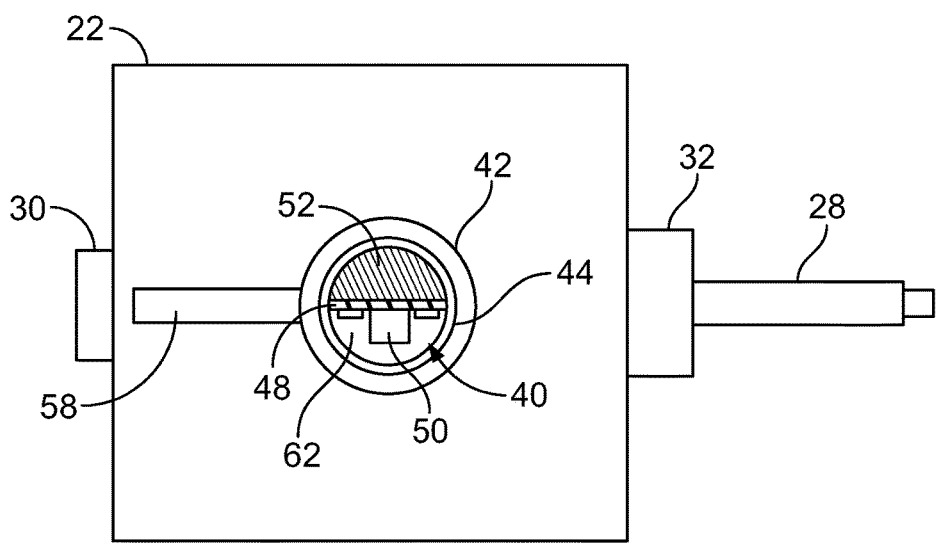
FIG. 3 is a schematic top plan view of an outer portion of a motor housing of the down unit, and showing a down tube stem with a printed circuit board located therein.

As is illustrated in FIGS. 2 and 3, the motor controller 40 can comprise a printed circuit board (PCB) 48 supporting electronic components, generally indicated at 50, forming motor control circuitry for controlling operation of the motor assembly 21. For example, the PCB 48 with the components 50 may comprise all of the circuitry for producing a PWM signal for a brushless DC motor formed by the motor assembly 21. The PCB 48 can comprise an elongated structure having a longitudinal axis extending along a portion of the length of the down tube assembly 14. As is best seen in FIG. 2, the PCB 48 can be mounted or attached to the down tube stem 44 at a location directly adjacent to and outside of the outer surface 46 of the motor housing 22.

As is known in the art, heat generating components, such as solid-state switches, may be mounted to the PCB 48. In order to avoid adding to the heat within the motor housing 22, i.e., heat generated within the motor housing 22 by the components of the motor assembly 21, the PCB 48 (motor controller 40) is located outside of the motor housing 22 and within the down tube assembly 14. Hence, the surface area of the down tube assembly 14 can be used to dissipate heat to the environment. In the particular configuration illustrated herein, the PCB 48 can be located extending substantially diametrically across the down tube stem 44 and can be in direct thermal contact with a heat sink 52, as seen in FIG. 3. The heat sink 52 can have a length extending along a length of the down tube assembly 14, and can have a cross section that is configured to match a space between the PCB 48 and an interior surface of the down tube stem 44, and is illustrated herein as having a semi-circular cross section to match the circular contour of the interior of the down tube stem 44. However, it should be understood that the heat sink 52 may have any outer shape that can match an alternative contour shape of an adjacent portion of the down tube assembly 14.

The heat sink 52 can be a block of thermally conductive metal, or other thermally conductive material or structure, affixed to both the PCB 48 and the down tube stem 44 at thermally conductive interfaces. For example, a thermal grease or adhesive may be provided as a thermally conductive interface between the heat sink 52 and the PCB 48, and between the heat sink 52 and an inner surface of the down tube stem 44. Additionally, as a result of the attachment of the heat sink 52 to the interior surface of the downtube assembly 14, the heat sink 52 can further function as a structural stiffening member for at least a portion of the down tube assembly 14.

Power and ground wires, generally depicted as 54 in FIG. 2, can extend from a power supply (not shown) in the boat 18 through the down tube 42 of the down tube assembly 14 to a contact location on the PCB 48, such as to attach to a location on the top of the PCB 48. Hall switch power and signal wires and motor phase leads, all generally depicted as 56, can extend from the PCB 48, such as at a bottom location on the PCB 48. The wires 56 can pass through a controller wire tunnel 58 extending along the outer surface 46 of the motor housing 22 from the down tube assembly 14 to a hole 60 through the motor housing 22. The wires 56 can pass through the hole 60 to the printed circuit board 31, providing electrical connections between the wires 56 and the Hall sensors 29 and windings of the stator 24. As noted above, other commutation structure can be provided to the motor assembly 21 such that the present invention is not limited to the particular configuration or type of motor described herein.

As seen in FIG. 3, an additional space 62 defined between the PCB 48 and the interior of the down tube assembly 14, opposite from the heat sink 52, can provide an area or clearance for passage of additional wires (not shown). Such wires may pass through the hole 60 in the motor housing 22 and provide connections between components or equipment in the boat 18 and any additional components in the down unit 12, such as components housed in the nose piece 34.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A trolling motor comprising:
a motor assembly including a motor housing, and a stator and a rotor within the motor housing, the rotor including a rotor shaft and a propeller mounted on the rotor shaft;
a down tube assembly having an upper end for support to a boat and a lower end, wherein the motor housing is supported to the lower end of the down tube assembly; and
a motor controller mounted to the down tube assembly and providing control signals to control rotation of the rotor within the motor housing wherein the motor controller receives signals from one or more sensors adjacent to the rotor to sense a position of the rotor.

2. The trolling motor as set forth in claim 1, wherein the down tube assembly comprises a down tube stem extending from the motor housing and a down tube rigidly affixed to the down tube stem.

3. The trolling motor as set forth in claim 2, wherein the motor controller is mounted to at least one of the down tube stem and the down tube.

4. The trolling motor as set forth in claim 1, wherein the motor controller is located within the down tube assembly.

5. The trolling motor as set forth in claim 4, wherein the down tube assembly comprises an interior surface having a contour, and including a heat sink in direct thermal contact with the motor controller and in thermal contact with the down tube assembly.

6. The trolling motor as set forth in claim 5, wherein the heat sink defines a contour matching the interior surface contour of the down tube assembly.

7. The trolling motor as set forth in claim 1, including a controller wire tunnel extending along an outer surface of the motor housing from the down tube assembly.

8. The trolling motor as set forth in claim 1, further including a nose piece attached to a first end of the motor housing and a tail piece attached to a second end of the motor housing, and a skeg attached to at least one of the nose piece, motor housing, or tail piece.

9. The trolling motor as set forth in claim 1, wherein the one or more sensors comprise at least one Hall sensor.

10. A trolling motor comprising:
a motor assembly including a motor housing, and a stator and a rotor within the motor housing, the rotor including a rotor shaft and a propeller mounted on the rotor shaft;
a down tube assembly having an upper end for support to a boat and a lower end, wherein the motor housing is supported to the lower end of the down tube assembly; and
a motor controller located within the down tube assembly adjacent to the motor housing and providing control signals to control rotation of the rotor within the motor housing.

11. The trolling motor as set forth in claim 10, including controller wires extending from the motor controller through an outer surface of the motor housing to the trolling motor.

12. The trolling motor as set forth in claim 11, including a controller wire tunnel extending along the outer surface of the motor housing from the down tube assembly.

13. The trolling motor as set forth in claim 10, wherein the motor controller includes a plurality of heat producing components and wherein the plurality of heat producing components are in thermal communication with the down tube assembly such that a portion of the heat produced by said heat producing components will be conducted to the environment through the down tube assembly.

14. The trolling motor as set forth in claim 13, including a heat sink member extending along a length of the down tube assembly, the heat sink member being in direct thermal communication with the heat producing components and further being attached to an interior surface of the down tube assembly and acting as a structural stiffening member to the down tube assembly.

15. The trolling motor as set forth in claim 10, wherein the down tube assembly comprises a down tube stem extending from the motor housing and a down tube rigidly affixed over the down tube stem, and the motor controller comprises a plurality of components mounted on a printed circuit board mounted within the down tube stem.

16. A trolling motor comprising:
a motor assembly including a motor housing, and a stator and a rotor within the motor housing, the rotor including a rotor shaft and a propeller mounted on the rotor shaft;
a down tube assembly having an upper end for support to a boat and a lower end, wherein the motor housing is supported to the lower end of the down tube assembly;
a motor controller located within the down tube assembly and providing control signals to control rotation of the rotor within the motor housing; and
a heat sink comprising a block of thermally conductive material affixed to an inner surface of the down tube assembly and in thermal contact with one or more of heat producing components in the motor controller, the heat sink further acting as a structural stiffening member to the down tube assembly.

17. The trolling motor as set forth in claim 16, wherein the motor controller is located in the lower end of the down tube assembly.

18. The motor controller as set forth in claim 16, wherein the motor controller is located adjacent to the motor housing.

19. The trolling motor as set forth in claim 16, wherein the trolling motor comprises a brushless DC motor and the motor controller comprises a pulse width modulation controller.

* * * * *